W. S. LEE.
VEHICLE SPRING.
APPLICATION FILED NOV. 24, 1911.

1,023,859.

Patented Apr. 23, 1912.

Witnesses
Albert A. Hofmann
Hugo W. Kreinbring

Inventor
William S. Lee.
By Edward S. Pagelsen,
Attorney

UNITED STATES PATENT OFFICE.

WILLIAM S. LEE, OF DETROIT, MICHIGAN, ASSIGNOR, BY MESNE ASSIGNMENTS, TO BRIGGS-DETROITER COMPANY, OF DETROIT, MICHIGAN, A CORPORATION OF MICHIGAN.

VEHICLE-SPRING.

1,023,859.      Specification of Letters Patent.      Patented Apr. 23, 1912.

Application filed November 24, 1911. Serial No. 662,242.

*To all whom it may concern:*

Be it known that I, WILLIAM S. LEE, a citizen of the United States, and a resident of Detroit, in the county of Wayne and State of Michigan, have invented a new and useful Vehicle-Spring, of which the following is a specification.

This invention relates to the springs for supporting the chassis or the bodies of vehicles, and particularly between the rear axles and chassis of automobiles, and its object is to provide a system of springs which shall permit free movement of the chassis or body relative to the axle, both vertically and laterally.

Figure 1:
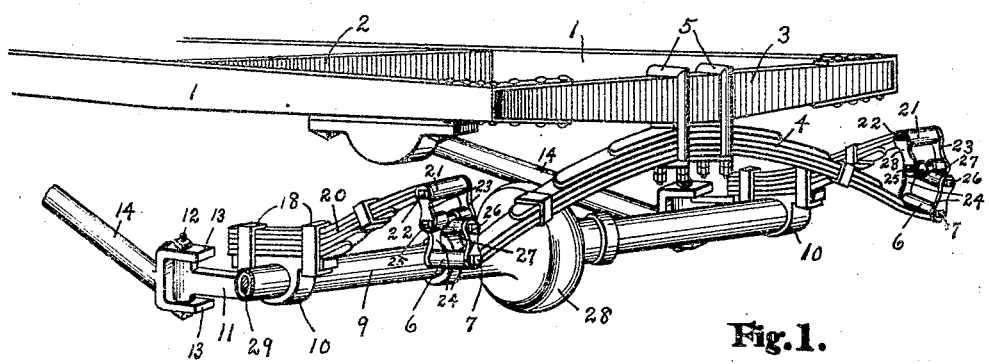
Figure 2:
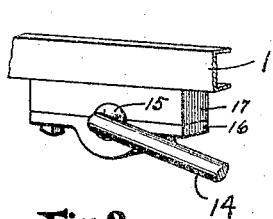
Figure 3:
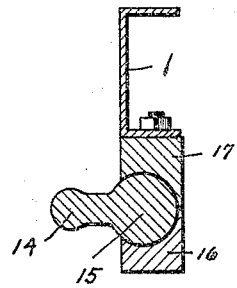

In the accompanying drawings, Figure 1 is a perspective of the springs at the rear end of an automobile chassis, a portion of the shaft casing and the gear casing being shown. Fig. 2 is a perspective view of the front end of the connecting arms between the chassis and the axle. Fig. 3 is a vertical, transverse section of a ball-and-socket bearing at the front end of the connecting arms.

Similar reference characters refer to like parts throughout the several views.

Ordinary spring constructions permit vertical movement between the body or chassis and the axle, but no lateral movement of the body, so that side blows, because of irregularities in the roadway, are usually transmitted to the passengers or other load with full force. The present device is so constructed that the axle may move longitudinally to a certain extent without affecting the chassis. The chassis or frame itself is formed with side bars 1 and cross bars 2 and 3. To the latter, a main transverse semi-elliptic spring 4 is secured by means of the clevises 5. The ends of this spring are formed into sleeves 6, through which the bolts 7 extend. Secured to the casing 9 of the axle are the clamps 10, having forwardly extending arms 11. These arms carry bolts 12 which are the pivots of the jaws 13 at the rear ends of the arms 14. These arms are formed with balls 15 at their front ends, which are revoluble in the bearings 16—17, secured to the side bars 1 of the chassis or frame. Secured to the clamps 10, by means of the yokes 18, are the short quarter-elliptical springs 20, which extend toward the ends of the transverse spring 4, and the ends of the short springs are formed into sleeves 21 which receive the bolts 22. Links 23 extend down from these bolts 22, and links 24 extend upwardly from the bolts 7. The bolts 25 at the lower ends of the links 23 and the bolts 26 at the upper ends of the links 24, extend through the knuckles 27 at right angles to each other.

Under normal conditions the springs 4 and 20 will yield, permitting the chassis and the axle casing 9 to approach and separate. Should a side blow occur, then the axle casing 9 is permitted to move longitudinally beneath the chassis, the links 24 swinging on the bolts 7 and the arms 14 swinging on the balls 15 and the bolts 12. The extent of this movement will not be large, but, with ordinary vehicles, may be two or three inches if desired. Should more movement be provided for, then the links 24 must be made longer in proportion than those shown in the drawing. As the bars 14 have balls at their front ends, they can swing in all directions. The axle is therefore permitted to move longitudinally with reference to its own axis as well as toward and from the chassis. The weight on the links 24 will return the axle longitudinally back to central position immediately.

The drawings show the gear case 28 and the axle 29, but these form no part of the invention, which is applicable to axles and frames of any desired construction.

I claim:

1. In a vehicle, the combination of a transverse spring secured to one end of the frame of the vehicle, an axle parallel thereto, short springs connected at one end to the axle and extending toward the ends of the transverse spring, connections between the ends of the springs, rigid arms extending from the axle in opposite directions from the short springs, movable arms connected thereto by vertical pivots and having balls at their outer ends, and bearings for said balls mounted on the frame.

2. In a vehicle, the combination of a transverse semi-elliptic spring secured at the middle to one end of the frame of the vehicle, an axle parallel thereto, short quarter-elliptical springs extending from the axle toward the ends of the transverse springs, yieldable connections between the adjacent ends of the springs, clamps connecting the short springs to the axle, connecting arms extending from said clamps oppositely to said short springs, and ball-and-socket bearings at the ends of said arms secured to the frame of the vehicle.

3. In a vehicle, the combination of a transverse semi-elliptic spring secured to one end of the frame of the vehicle, an axle parallel thereto, short quarter-elliptical springs secured to the axle and extending toward the ends of the transverse spring, connections between the ends of the springs whereby the weight on the transverse spring is transmitted to the short springs, and arms connecting to said axle at the short springs and to said frame, so as to permit the axle to move longitudinally with respect to the frame.

In testimony whereof I have signed this specification in the presence of two subscribing witnesses.

WILLIAM S. LEE.

Witnesses:
WILLIAM T. HEWITT,
EDWARD N. PAGELSEN.